July 7, 1931. P. S. MORGAN 1,813,069
SHOCK ABSORBER
Original Filed May 12, 1924 4 Sheets-Sheet 4

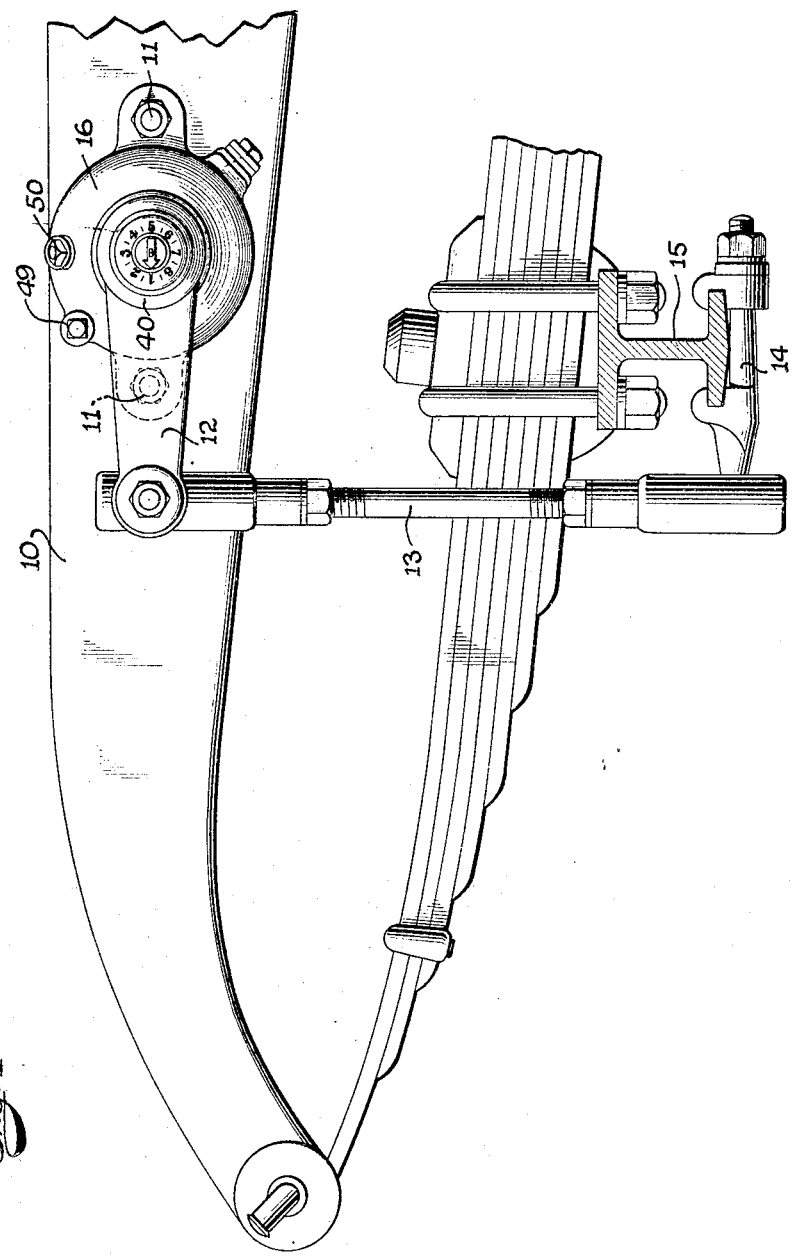

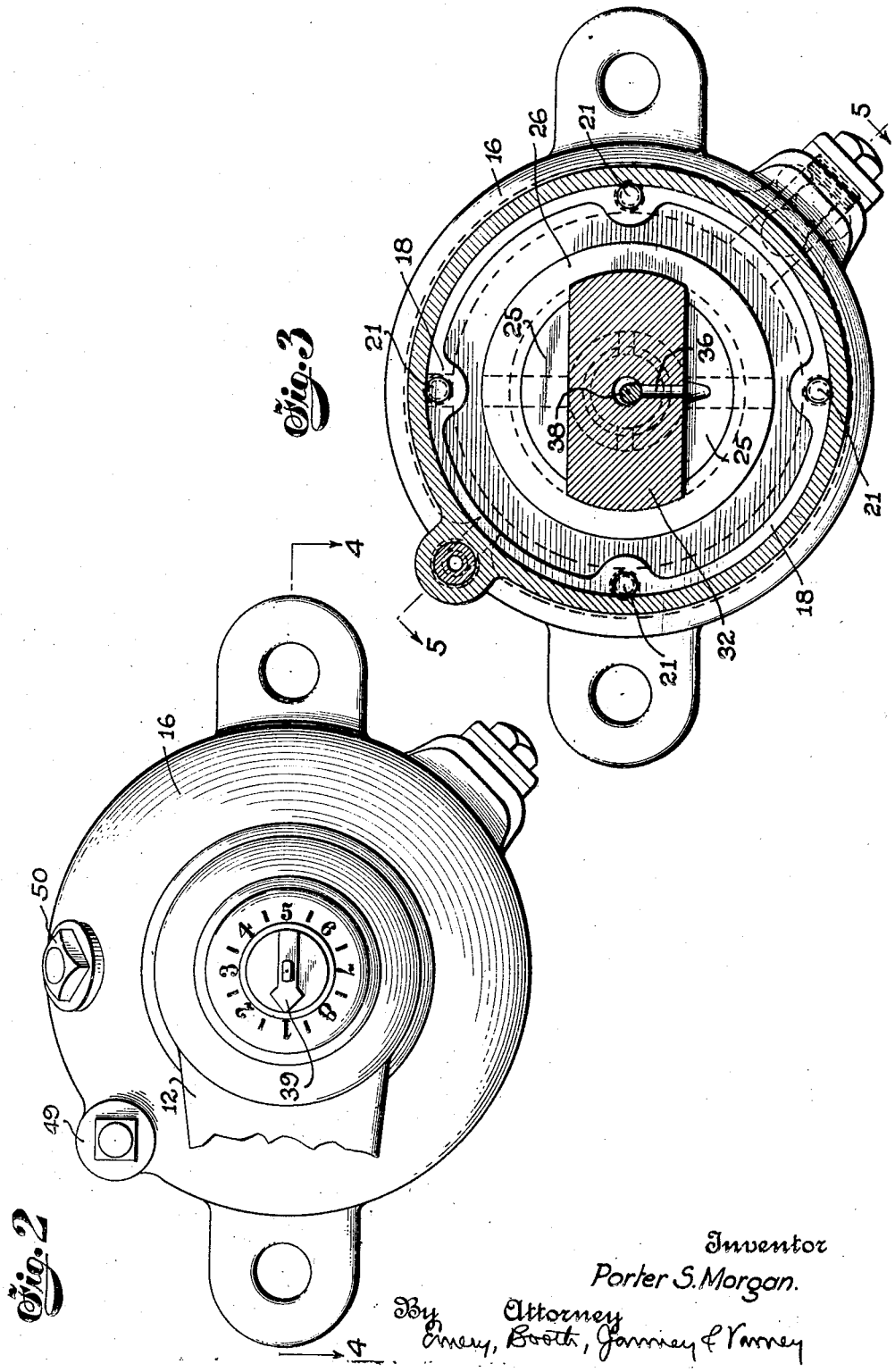

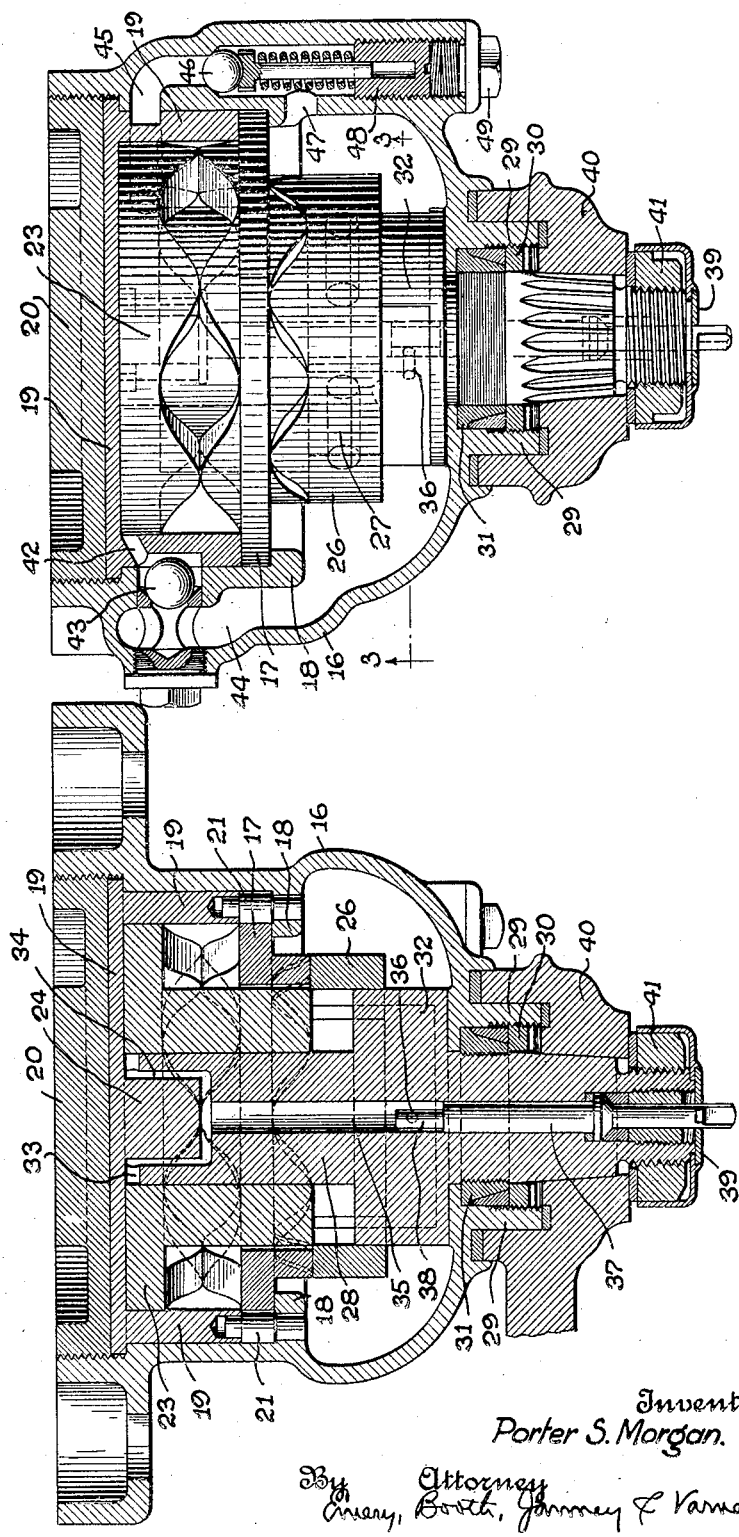

Inventor
Porter S. Morgan.
By Attorney
Emery, Booth, Janney & Varney

Patented July 7, 1931

1,813,069

UNITED STATES PATENT OFFICE

PORTER S. MORGAN, OF NEW YORK, N. Y., ASSIGNOR TO MORGAN, BLODGETT, MORGAN, INC., OF NEW YORK N. Y., A CORPORATION OF NEW YORK

SHOCK ABSORBER

Application filed May 12, 1924, Serial No. 712,526. Renewed October 5, 1925.

This invention purposes the improvement of shock absorbing devices adapted to reduce and control the communication of movements or shocks from one element to another. The accompanying drawings exhibit, as one illustrative embodiment of the invention, a hydraulic shock absorber particularly applicable to automobiles and other vehicles.

Figure 7:
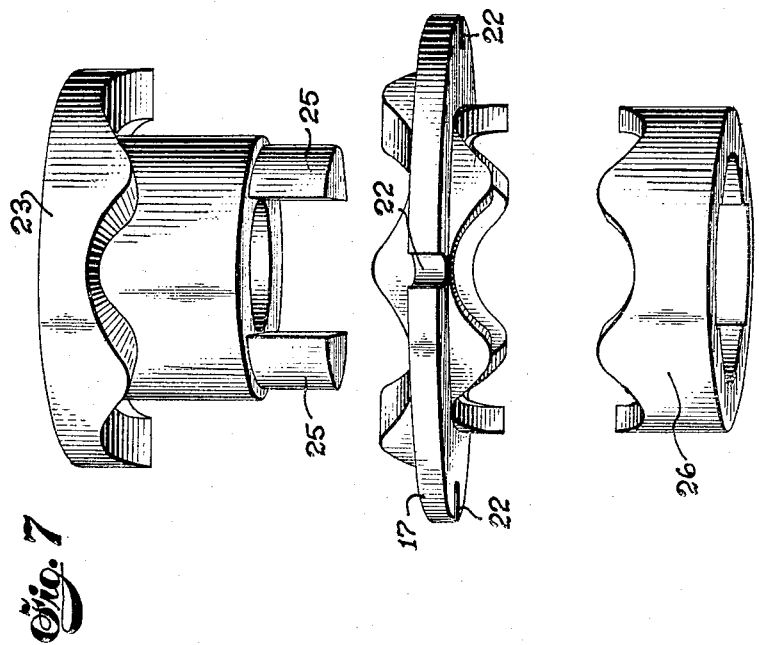
Figure 6:
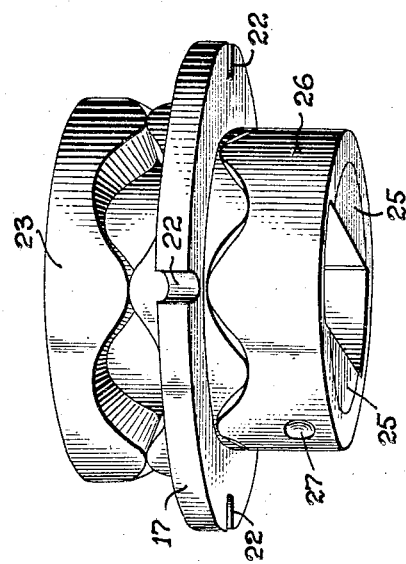

In the drawings of this embodiment Figure 1 is a front elevation, reduced in size, showing the absorber attached to the automobile frame or body and operatively connected with the axle or running-gear; Figure 2 is a front elevation of the absorber casing; Figure 3 is a vertical section taken through the absorber on the line 3—3 in Figure 5; Figure 4 is a transverse section taken on the line 4—4 in Figure 2; Figure 5 is a transverse section taken on line 5—5 in Figure 3, but leaving certain parts in elevation; Figure 6 shows the piston and associated cam members in proper relative position; and Figure 7 shows these members disassembled and separated from one another.

Referring to Figure 1, the absorber proper is adapted to be firmly secured to the automobile body or frame 10 in any usual manner, as by bolts 11. The operative connection between the absorber and the running-gear comprises the oscillatory arm 12, the pitman 13 and the clamp member 14 arranged for attachment to the axle 15. In practice the connections between the pitman 13, the arm 12 and the clamp member 14 are of the universal type to permit proper freedom in all relative movements of the body and running-gear.

As best shown in Figures 4 and 5, the operating parts of the absorber are housed within the casing 16. Centrally fixed within the casing is the annular double or two-faced cam 17 (see Figures 5, 6 and 7) secured against longitudinal movement by marginal impingement between the lip or ledge 18 integral with the casing 16 (Figures 3, 4 and 5), and the edge of the cup cylinder 19 which, in turn, is held against displacement by the plug 20 screwed into the back of the casing 16. The double cam 17 is secured against rotative movement by marginal pins 21 (Figures 3 and 4), which, firmly fixed in the circumferential lip 18, fit through recesses 22 (Figures 6 and 7) formed in the edge of the cam 17, and project into apertures formed in the edge of the cup cylinder 19.

Thus the double cam 17, the cup cylinder 19, and the absorber casing 16, are positively interlocked against all relative movement.

Adapted for rotative and longitudinal movement within the cup cylinder 19 is the annular cam piston 23 (Figures 4, 5, 6 and 7) whereof the peripheral margin facing the cam 17 is shaped in symmetrical hills and dales contacting and corresponding in conformation with adjacent hills and dales of the cam 17.

The central body portion of the piston 23 is tubular in shape (Figures 7, 4 and 6), passes through the central opening of the annular cam 17, and is provided at its end with a pair of segmental lugs 25. These lugs constitute positioning members for the secondary cam member 26, whereof the peripheral margin facing the cam 17 is also shaped in symmetrical hills and dales contacting and corresponding in conformation with adjacent hills and dales of the cam 17, which thus lies between the cam surfaces of the piston 23 and the cam surfaces of the secondary cam member 26.

The secondary cam member 26 is rigidly secured to and made operatively integral with the piston 23 by pinning the member 26 to the lugs 25 with dowel pins 27 passed radially through the wall of the cam member into the lugs.

The relative position of the parts is such that rotary movement of the piston 23 and its secondary cam member 26 causes simultaneous longitudinal movement of the piston and secondary cam member, for when the cam hills of the piston 23 are crest-to-crest with the adjacent cam hills of the fixed cam 17, the cam hills on the opposite face of the fixed cam 17 are in opposite relation, crest-to-dale, to those of the secondary cam member 26. Conversely, when the cam hills of the secondary cam member 26 are crest-to-crest with their adjacent cam hills of the fixed cam 17, the cam surfaces of the piston 23 are in crestto-dale position relative to the corresponding cam surfaces of the cam 17. The conformation of the cam surfaces is such that when the piston 23 and the secondary cam member 26, are rotated relatively to the fixed double cam 17, the cam surfaces remain in constant contact with each other, causing the piston and secondary cam member to move axially relatively to the fixed cam during such rotation.

Axially positioned within and through the annular piston 23, the fixed cam 17, and the secondary cam member 26, is the oscillatory spindle 28. The inner end of the spindle 28 passing through the central aperture of the piston 23 is bored to surround and bear upon a central bearing post 24 projecting from the interior bottom of the cup cylinder 19. The outer portion of the spindle 28 is journaled in and projects through the casing 16, where an internally threaded collar 29 admits an annular packing gland 30 to compress suitable packing 31 into leakage-preventing grooves cut upon the spindle.

Midway of its length the spindle 28 is enlarged to form a flat-sided key 32 adapted to fit (see Figures 3, 6 and 7) between the opposite flat portions of the segmental lugs 25, so that as the spindle 28, with its key 32, is oscillated, the secondary cam member 26 and the piston 23 are oscillated by and with it, but may move longitudinally with relation to it.

The circumferential wall of the bored end of the spindle 28 (Fig. 4) surrounding the bearing post 24 has one or more radial holes 33 drilled therethrough to connect with longitudinal grooves 34 cut in the spindle, forming passages running past the bearing post 24 and converging in the main axial passage 35 which opens through the lateral passage 36 (Figures 3 and 4) into the main interior of the casing 16. Journaled in the outer continuation of the passage 35 is the stem 37, whereof the inner end forms an eccentric tongue 38 effective adjustably to restrict the passage 36. The stem 37 passes, through suitable packing, out of and past the end of the spindle 28, where it may be turned to any point desired as indicated by the pointer 39 (Figures 2, 4 and 5) shaped to fit and turn with the stem 37.

The threaded packing collar 29 of the casing 16 (Figure 4 and 5) is surrounded by and forms a bearing for the hub 40 of the oscillating operating arm 12, suitable packing being provided to prevent leakage between the collar and the hub. Referring to Figure 5, the hub 40 also surrounds and interlocks with the end of the spindle 28 projecting through the casing 16, this portion of the spindle being shown tapered and grooved to fit and adjustably to lock with the correspondingly shaped central aperture of the hub 40.

The hub 40 is held in position by a lock nut 41 threaded upon the extreme end of the spindle 28.

Referring to the upper left-hand portion of Figure 5, through the wall of the cup cylinder 19 a passage 42 leads from the interior of the cup cylinder past the ball check 43, through the passage 44, to the main interior of the casing 16.

The opposite wall of the cup cylinder 19 is similarly pierced by another passage 45 which leads from the interior of the cup cylinder 19, past the ball check 46, through the orifice 47, also into the main interior of the casing 16.

The ball check 46 is spring-pressed to its seat, adjustment of spring-pressure being provided by a threaded plug 48 accessible from the exterior of the absorber casing by the removal of the nut 49.

In operation, the absorber is charged with a suitable liquid, such as oil, which may be introduced through a usual filling opening shown closed by the plug 50 (Figure 2). In the present specific embodiment the relation of the parts is such that oil may act not only as a hydraulic agent to govern the operation of the device, but also as a lubricant between relatively moving parts.

In Figures 1 to 5 inclusive the absorber is shown in what may be called normal position: i. e., approximately such a position as it should occupy when the car is not in motion, or when it is moving upon an absolutely level surface.

When, in response to road irregularities, the axle 15 rises from its normal position toward the frame 10, the resultant upward movement of the pitman 13 turns the absorber arm 12 in a clockwise direction, resulting in a similar rotative movement of the piston 23 and the secondary cam member 26. Referring to Figure 5, the crests of the cam hills of the member 26 now approach the corresponding crests of the fixed cam 17. Simultaneously the crests of the cam hills of the piston 23 commence their descent into the dales between the corresponding cam hills of the fixed cam 17.

In this manner the oscillatory movement of the arm 12 in a clockwise direction results in the longitudinal movement of the piston 23 toward the fixed cam 17.

This motion of the piston 23 draws oil freely past the ball check 43 through the passage 42 into the space created back of the piston, no resistance being opposed to these movements.

When, however, under the influence of the recoiling vehicle spring, the absorber arm 12 is moved in the opposite direction, i. e., counter-clockwise, the resultant opposite operation of the cam surfaces thrusts the piston 23 away from the fixed cam 17; and this movement of the piston is resisted by the oil now imprisoned by the closure of the ball valve 43.

Egress for this oil is provided through the passages 33, 34, 35 and 36, adjustably restricted by the eccentric tongue 38 as previously described.

In this manner, while the absorber offers no material resistance to upward motion of the axle 15 away from its normal position toward the body or frame, the return separating movement is controlled and resisted until the parts once more assume their original normal position.

Similarly, when because of road irregularities the axle 15 drops downwardly, away from its normal position, causing the absorber arm 12 to move downwardly from its normal position, in a counter-clockwise direction, there is no resistance to this motion. Again the relative movement of the cam surfaces causes the piston 23 to approach the fixed cam 17, drawing oil after it through the inwardly opening ball check 43. But when the abnormally separated axle and frame begin their return movement, the piston 23 again retreats from the fixed cam 17, resisted by the oil behind it until the parts have again reached their normal position.

Upward movements of the axle 15 from its normal position are caused primarily by hummocks or obstructions in the roadway over which the vehicle is traveling. It is desirable that in passing over such hummocks the axle should be permitted to approach the body or frame substantially without other resistance than that interposed by the vehicle spring. The absorber, resisting the opposite return movement, damps the spring recoil and prevents the undersirable toss which otherwise results.

Downward movements of the axle 15 away from its normal position are caused primarily by hollows or holes in the roadway over which the vehicle is traveling. It is desirable that in traversing such holes or hollows the axle should be allowed to drop freely away from the body without material resistance. The absorber, resisting the return movement of the approaching body and axle prevents the undesirable falling movement of the body that otherwise would result. Tests appear to indicate that hollows or holes in the roadway result in much more violent jolts to the vehicle body than do hummocks or obstructions. When a hollow in the roadway permits the axle to drop away from its normal supporting position, the vehicle body, lacking its usual degree of spring support, begins a downward falling movement which gains force with its momentum. This falling movement the present absorber resists, thereby tending to permit the axle to fall freely away from the body, while preventing a similar following movement of the body.

Oftentimes, however, a hollow or hole in the roadway is so shaped as to subject the axle to a sudden drop quickly followed by an equally sudden upward movement. In instances of this kind the absorber resists not only the normal tendency of the vehicle body in its falling movement toward the axle, but also the violent upward thrust exerted upon the axle before the axle and body have reached their normal relative position. The resistance of the absorber to these sudden combined forces may result, unless relieved, in transmitting a jolt to the vehicle. To prevent these or other violent jolts, the auxiliary outlet 45 governed by the spring-pressed ball check 46 is provided whereby such unusual pressures may be relieved otherwise than through the restricted passages 33, 34, 35 and 36.

While, under ordinary circumstances, the extreme possible movements of the axle and body toward or away from each other do not occur, it is nevertheless desirable to damp or resist such extreme movments to prevent collision of the axle with the body, and to prevent dropping of the axle away from the body to a point where its full weight is sustained by the springs alone. In the present embodiment such damping of extreme movements is effected by the inter-action of the cam elements of the fixed cam 17 and the piston 23; for while the limits of ordinary relative movement between the body and axle away from their normal relative position, in either direction, bring the cam elements only into such position that the crest of each cam hill of the members 17 and 23 rests in the bottom of each corresponding dale, further (i. e. extreme) continued movement causes these cam hills to commence an ascending movement resulting in renewed compressing action of the piston 23, and a consequent hydraulic resistance thereto.

In this manner the body or frame and the axle cannot be forced into collision without an intervening cushioning resistance, nor can the axle drop away from the body to the full distention of the springs without an intervening supporting action.

The absorber herein described is peculiarly adapted to withstand all pressures, light or heavy, in that the piston 23 and spindle 28 are so arranged that the piston may move longitudinally relative to the spindle, the longitudinal thrust exerted on the piston by the pressures built up when the absorber is subjected to shocks being taken directly by the casing, and not being transmitted to the spindle.

When the shock absorber is first put in use, or when new oil is introduced, or, occasionally during the ordinary operation of the obsorber, small quantities of air may find their way into the space back of the piston and, unless eliminated, may tend to impair the operation of the instrument. It will be noted, by reference to Figures 1 and 5, that when the absorber is in operative position, the passage 45 and check valve 46 are located at the top of the absorber, where such air naturally collects. When the absorber is subjected to sufficient shocks, the resulting pressures force the air so collected past the valve 46 and through passage 47, thus eliminating undesirable air from the working chamber of the absorber.

Theoretically the function of the ideal shock absorber is to hold the body of the vehicle at a constant distance from the mean plane of the roadway while permitting the running-gear to follow the varying road contours. To this end it has sometimes been supposed that all recoil movements, however minute, should be resisted or checked. Practically, however, it has been found advantageous to permit a certain range of unrestricted movement in both directions by the axle and body relative to each other. Vibrations of the vehicle spring consequent upon slight irregularities of the roadway do not usually result in undesirable movements of the vehicle body, while an absorber which acts to damp these inconsiderable movements or "ripples" may contribute to an apparent stiffness or vibration in the action of the vehicle.

To provide freedom of spring action within a reasonable range upon both sides of the theoretical norm, the crests of the absorber cam hills are somewhat truncated, and the dales correspondingly flattened, to permit a degree of relative rotation of the piston without causing material longitudinal movement thereof, and consequently without causing displacement of the fluid.

Thus in the present embodiment, while the effect of considerable obstructions and depressions in the roadway is compensated by the absorber to prevent undersirable movements of the vehicle body, the vehicle springs and the body are left free to respond to and take up inconsequential irregularities in the contour of the road.

It will be observed that due to the construction of the cams and piston described herein the oscillatory arm 12 may, if desired, be rotated through a circle of 360 degrees, and that it may be set in normal operative position for connection to the vehicle at either of two points spaced 180 degrees apart. This feature is of practical value in installing or attaching the absorber in that the same absorber may be attached either to the right or left side of the vehicle, and will function properly on either side.

The invention is not limited to the specific illustrative embodiment hereinbefore described.

Claims:

1. A hydraulic shock absorber for spring-supported vehicles comprising in combination means for attaching the body of the absorber to one of two relatively movable parts of the vehicle, an oscillatory arm, having a normal intermediate position, operatively connecting the absorber to the other of said parts of the vehicle, a piston operated by said arm and provided with cam surfaces, a supplementary cam member integral with said piston, a double cam having opposed cam surfaces positioned between and in contact with the cam surfaces of said piston and said supplementary cam member in such manner that rotation of said piston results in longitudinal movement thereof in accordance with the direction and extent of rotation, a cylinder wherein said piston is adapted to operate to compress fluid within said cylinder when said arm moves toward its said normal intermediate position in either direction, means adjustable to permit and restrict the flow of fluid when so compressed, and auxiliary means to relieve compression when extraordinary forces are transmitted to the absorber.

2. A hydraulic shock absorber for spring-supported vehicles comprising in combination means for attaching the body of the absorber to one of two relatively movable parts of the vehicle, an oscillatory arm, having a normal intermediate position, operatively connecting the absorber to the other of said parts of the vehicle, a piston operated by said arm and provided with cam surfaces, a supplementary cam member integral with said piston, a double cam having opposed cam surface positioned between and in contact with the cam surfaces of said piston and said supplementary cam member in such manner that rotation of said piston results in longitudinal movement thereof in accordance with the direction and extent of rotation, a cylinder wherein said piston is adapted to operate to compress fluid within said cylinder when said arm moves toward its said normal intermediate position in either direction, and means adjustable to permit and restrict the flow of fluid when so compressed.

3. A hydraulic shock absorber for spring-supported vehicles comprising in combination means for attaching the body of the absorber to one of two relatively movable parts of the vehicle, an oscillatory arm, having a normal intermediate position, operatively connecting the absorber to the other of said parts of the vehicle, a piston co-operative with said arm, a cylinder wherein said piston is adapted to operate to compress fluid, means adjustable to permit and restrict the flow of fluid when so compressed, double-acting cam means co-operative with said piston and adapted to cause a compression movement of said piston within said cylinder when said arm moves toward its said normal intermediate position from either side thereof, and auxiliary means to relieve compression when extraordinary forces are transmitted to the absorber.

4. A hydraulic shock absorber for spring-supported vehicles comprising in combination means for attaching the body of the absorber to one of two relatively movable parts of the vehicle, an oscillatory arm, having a normal intermediate position, operatively connecting the absorber to the other of said parts of the vehicle, a piston co-operative with said arm, a cylinder wherein said piston is adapted to operate to compress fluid, means adjustable to permit and restrict the flow of fluid when so compressed, and double-acting cam means co-operative with said piston and adapted to cause a compression movement of said piston within said cylinder when said arm moves toward its said normal intermediate position from either side thereof.

5. A hydraulic shock absorber for spring-supported vehicles comprising in combination means for attaching the body of the absorber to one of two relatively movable vehicle parts having a normal relative position, means having a corresponding normal intermediate position operatively connecting the absorber to the other of said vehicle parts, fluid-compression means co-operative with said last-named means, means adjustable to permit and control the movement of compressed fluid, and double-acting cam means co-operative with said fluid-compression means whereby compressing action of said fluid-compression means is consequent upon relative movement of said movable vehicle parts toward their normal relative position in either direction.

6. A hydraulic shock absorber for spring-supported vehicles comprising in combination means for operatively interconnecting the absorber with two relatively movable vehicle parts having a normal relative position, fluid-compression means co-operative with said last-named means, cam means co-operative with said fluid-compression means whereby relative movement of said vehicle parts toward their normal relative position in either direction actuates said fluid-compression means to retard said movement, and means to adjust the degree of retarding action.

7. A hydraulic shock absorber for spring-supported vehicles comprising in combination means for operatively interconnecting the absorber with two relatively movable vehicle parts having a normal relative position, fluid-compression means cooperative with said last-named means and adapted by compressing action to resist relative movements of said parts in either direction toward said normal position but to allow relatively free movements of said parts away from said position, and auxiliary pressure-relieving means to relieve compression when extraordinary forces are transmitted to the absorber.

8. A hydraulic shock absorber for spring-supported vehicles comprising in combination means for operatively interconnecting the absorber with two relatively movable vehicle parts having a normal relative position, means cooperative with said last-named means adapted to resist relative movements of said parts in either direction toward said normal position but to allow relatively free movements of said parts away from said position, and auxiliary relief means to reduce resistance when extraordinary forces are transmitted to the absorber.

9. A hydraulic shock absorber for spring-supported vehicles comprising in combination means for operatively interconnecting the absorber with two relatively movable vehicle parts having a normal relative position, fluid-compression means cooperative with said last-named means, means adjustable to permit and control the movement of compressed fluid, cam means cooperative with said fluid compression means whereby compressing action thereof is caused upon relative movement of said vehicle parts toward their normal relative position in either direction, and means for resisting extreme movements of said vehicle parts away from their normal relative position.

10. A hydraulic shock absorber for spring-supported vehicles comprising in combination means for operatively interconnecting the absorber with two relatively movable vehicle parts having a normal relative position, fluid compression means cooperative with said last-named means, means cooperative with said fluid compression means whereby compressing action thereof is caused upon relative movement of said vehicle parts toward their normal relative position in either direction, and means for resisting extreme movements of said vehicle parts away from their normal relative position.

11. A hydraulic shock absorber for spring-supported vehicles comprising in combination means for operatively interconnecting the absorber with two relatively movable vehicle parts having a normal relative position, means operative upon relative movement of said vehicle parts in either direction toward their normal position to retard said movement, means operative upon relative movement of said vehicle parts in either direction away from their normal position to free said last-named movement, and means operative upon the close approach of said vehicle parts to retard further approaching movement.

12. In a hydraulic shock absorber for spring-supported vehicles, in combination, a casing, means for attaching said casing to one of two relatively movable parts of the vehicle, a piston in said casing dividing the same into two compartments, means providing passages connecting said compartments, and means for connecting said piston to the other of said relatively movable parts adapted, first, to cause movement of said piston in one direction, and then to cause movement of said piston in the opposite direction upon continued movement of said relatively movable parts in either direction away from normal position and to cause corresponding respective movements of said piston in opposite directions upon return movement of said relatively movable parts in either direction toward normal position.

13. In a hydraulic shock absorber for spring-supported vehicles, in combination, a casing, means for attaching said casing to one of two relatively movable parts of a vehicle a piston in said casing dividing the same into two compartments, means permitting substantially free movement of said piston in one direction and for causing retarded movement of said piston in the opposite direction, and means for connecting said piston to the other of said relatively movable parts adapted to cause movement of said piston, first, in its free direction and then in its restricted direction upon continued movement of said relatively movable parts in either direction away from normal position and to cause movement of said piston, first, in its free direction and then in its retarded direction upon return of said relatively movable parts in either direction toward normal position.

14. A hydraulic shock absorber for spring supported vehicles, comprising, in combination, means for operatively interconnecting the absorber with two relatively movable vehicle parts having a normal relative position, means for resisting relative movement between said vehicles parts, means for relieving said resistance when extraordinary force is applied to the absorber, and means operative upon the close approach of said vehicle parts to resist further approaching movement to prevent the forceful meeting thereof.

15. A hydraulic shock absorber for spring supported vehicles, comprising, in combination, means for operatively interconnecting the absorber with two relatively movable vehicle parts having a normal relative position, means for resisting relative movement between said vehicle parts, means for relieving said resistance when extraordinary force is applied to the absorber, and means operative to cushion and resist extreme separation of said movable vehicle parts.

16. A hydraulic shock absorber for spring supported vehicles, comprising, in combination, means for operatively interconnecting the absorber with two relatively movable vehicle parts having a normal relative position, means for resisting relative movement between said vehicle parts, means for permitting substantially free relative movements of said parts over a limited range in either direction both toward and away from normal relative position, means for relieving resistance to relative movements of said parts when extraordinary forces are exerted upon the absorber, and means to cushion the close approach of said vehicle parts.

17. A hydraulic shock absorber for spring supported vehicles comprising, in combination, means for operatively interconnecting the absorber with two relatively movable vehicle parts having a normal relative position, means for resisting relative movement between said vehicle parts, means to permit substantially free relative movements of said parts through a limited range in both directions toward and away from normal relative position, means for relieving resistance to relative movements of said parts when extraordinary forces are exerted upon the absorber, and means to cushion and resist extreme separation of said relatively movable parts.

18. A shock absorber for spring supported vehicles, comprising, in combination, means for operatively interconnecting the absorber with two relatively movable vehicle parts having a normal relative position, means to resist relative movement of said parts in either direction toward said normal position, but to allow relatively free movement of said parts away from said position, means to allow relatively free movements between said parts through a limited range in either direction both toward and away from said normal position, and means to cushion the close approach of said parts.

19. A shock absorber for spring supported vehicles, comprising, in combination, means for operatively interconnecting the absorber with two relatively movable vehicle parts having a normal relative position, means to resist relative movement of said parts in either direction toward said normal position, but to allow relatively free movement of said parts in either direction away from said position, means to allow relatively free movement between said parts through a limited range in either direction both toward and away from said normal position, and means to cushion and resist the extreme separation of said movable parts.

20. A hydraulic shock absorber for spring supported vehicles, comprising, in combination, means for operatively interconnecting the absorber with two relatively movable parts having a normal relative position, means cooperative with said last named means to resist relative movement of said parts in either direction toward said normal position, but to allow relatively free movement of said parts away from said position, means for relieving resistance to relative movement between said parts when subjected to extraordinary forces, and means to cushion the close approach of said parts.

21. A hydraulic shock absorber for spring supported vehicles, comprising, in combination, means for operatively interconnecting the absorber with two relatively movable vehicle parts having a normal relative position, means cooperative with said last named means to resist relative movement of said parts in either direction toward said normal position, but to allow relatively free movement of said parts away from said position, means for relieving resistance to relative movement between said parts when subjected to extraordinary forces, and means to cushion and resist the extreme separation of said parts.

22. A hydraulic shock absorber for spring supported vehicles, comprising, in combination, means for operatively interconnecting the absorber with two relatively movable vehicle parts having a normal relative position, means cooperative with said last named means to allow relatively free movement of said parts away from said normal position but to resist return movement of said parts in a direction toward said normal position, means for relieving the resistance to relative movement of said parts when subjected to extraordinary forces, and means to cushion the close approach of said parts.

23. A hydraulic shock absorber for spring supported vehicles, comprising, in combination, means for operatively interconnecting the absorber with two relatively movable vehicle parts having a normal relative position, means cooperative with said last named means to allow relatively free movement of said parts away from said normal position but to resist return movement of said parts in a direction toward said normal position, means for relieving the resistance to relative movement of said parts when subjected to extraordinary forces, and means to cushion and resist the extreme separation of said parts.

24. A shock absorber for spring supported vehicles, comprising, in combination, means for operatively interconnecting the absorber with two relatively movable vehicle parts having a normal relative position, means cooperative with said last named means to resist relative movement of said parts in either direction toward said normal position, but to allow relatively free movement of said parts away from said position, and means to cushion the close approach of said parts.

25. A shock absorber for spring supported vehicles, comprising, in combination, means for operatively interconnecting the absorber with two relatively movable vehicle parts having a normal relative position, means cooperative with said last named means to resist relative movement of said parts in either direction toward said normal position, but to allow relatively free movement of said parts away from said position, and means to cushion and resist the extreme separation of said parts.

26. A hydraulic shock absorber for spring supported vehicles, comprising, in combination, a casing, a piston in said casing adapted to move relatively thereto, means whereby movement of said piston in one direction between given points is resisted and movement in the opposite direction between said points is unresisted, and means for connecting said casing and piston to two relatively movable vehicles parts having a normal relative position, adapted to cause said resisted movement of said piston upon extreme separation of said vehicle parts.

27. A hydraulic shock absorber for spring supported vehicles, comprising, in combination, a casing, a piston in said casing adapted to move relatively thereto, means whereby movement of said piston in one direction between given points is resisted and movement in the opposite direction between said points is unresisted, and means for connecting said casing and piston to two relatively movable vehicle parts having a normal relative position, adapted to permit said unresisted movement of said piston upon initial relative movement of said vehicle parts in either direction away from normal position, but to cause said resisted movement of said piston upon continued or extreme movement of said vehicle parts in either direction away from normal position, and to permit said unresisted movement of said piston during initial return movement followed by said resisted movement of said piston upon continued return movement to normal position.

28. A shock absorber for spring supported vehicles, comprising, in combination, two relatively movable parts, means to resist relative movement of said parts in one direction between given points but to permit unresisted relative movement of said parts in another direction between said points, and means for connecting said relatively movable parts to two relatively movable vehicle parts having a normal relative position, adapted to permit said unresisted movement of said parts upon initial relative movement of said vehicle parts in either direction away from normal position, but to cause said resisted movement of said parts upon continued or extreme movement of said vehicle parts in either direction away from normal position, and to permit said unresisted movement of said parts during initial return movement followed by said resisted movement of said parts upon continued return movement to normal position.

29. A hydraulic shock absorber for spring supported vehicles, comprising, in combination, means for operatively interconnecting the absorber with two relatively movable vehicle parts having a normal relative position, means cooperative with said last named means to resist relative movement of said parts in either direction toward said normal position but to allow relatively free movements of said parts away from said position, and pressure relieving means including a spring pressed ball check valve operative to quickly release excessive pressures in response to extraordinary forces applied to the absorber.

In testimony whereof, I have signed my name to this specification this 16th day of April, 1924.

PORTER S. MORGAN.